(12) United States Patent
Won et al.

(10) Patent No.: US 10,214,183 B2
(45) Date of Patent: Feb. 26, 2019

(54) METHOD OF DEFOGGING INNER SURFACE OF VEHICLE WINDSHIELD GLASS

(71) Applicant: LG ELECTRONICS INC., Seoul (KR)

(72) Inventors: Jaeyoung Won, Seoul (KR); Sungjin Kim, Seoul (KR); Gumbae Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/686,637

(22) Filed: Aug. 25, 2017

(65) Prior Publication Data
US 2018/0056941 A1 Mar. 1, 2018

(30) Foreign Application Priority Data

Aug. 26, 2016 (KR) .......................... 10-2016-0109474

(51) Int. Cl.
| | | |
|---|---|---|
| G06F 7/00 | (2006.01) | |
| B60S 1/02 | (2006.01) | |
| B60H 1/00 | (2006.01) | |
| B60H 1/22 | (2006.01) | |

(52) U.S. Cl.
CPC .......... B60S 1/026 (2013.01); B60H 1/00785 (2013.01); B60H 1/00907 (2013.01); B60H 1/2215 (2013.01)

(58) Field of Classification Search
CPC . B60S 1/026; B60H 1/00785; B60H 1/00907; B60H 1/2215
See application file for complete search history.

(56) References Cited

U.S. PATENT DOCUMENTS

| | | | | |
|---|---|---|---|---|
| 2006/0000597 A1* | 1/2006 | Errington | ........... | B60H 1/00785 165/204 |
| 2008/0173437 A1* | 7/2008 | Yelles | ................ | B60H 1/00785 165/204 |
| 2009/0039170 A1* | 2/2009 | Burns | ................ | B60H 1/00785 236/44 A |

FOREIGN PATENT DOCUMENTS

| | | | |
|---|---|---|---|
| JP | 6-286454 | A | 10/1994 |
| JP | 8-258545 | A | 10/1996 |
| JP | 8-258547 | A | 10/1996 |
| JP | 2009-154868 | A | 7/2009 |
| KR | 10-2011-0002652 | A | 1/2011 |

* cited by examiner

*Primary Examiner* — Adam M Alharbi
(74) *Attorney, Agent, or Firm* — Birch, Stewart, Kolasch & Birch, LLP

(57) ABSTRACT

A method of defogging an inner surface of a vehicle windshield glass. The method includes a first process of defogging by changing a heating, ventilation, and air-conditioning (HVAC) system from a heating mode to a cooling mode when fogging occurs on the inner surface of the vehicle windshield glass; once the inner surface of the vehicle windshield glass is changed to a defogging state by the first process, a second process of pre-defogging by turning off a compressor of the HVAC system for a predetermined period of time under a prescribed condition to prevent flash fogging; and after the second process, when the predetermined period of time elapses, a third process of turning on the compressor to return from the cooling mode to the heating mode.

17 Claims, 5 Drawing Sheets

METHOD OF DEFOGGING INNER SURFACE OF VEHICLE WINDSHIELD GLASS

CROSS REFERENCE TO RELATED APPLICATIONS

This non-provisional application claims the benefit under 35 U.S.C. § 119(a) to Patent Application No. 10-2016-0109474, filed in Republic of Korea on Aug. 26, 2016, the contents of which are hereby expressly incorporated by reference into the present application.

BACKGROUND OF THE INVENTION

1. Field of the Invention

The present disclosure relates to a method of defogging an inner surface of a vehicle windshield glass, which minimizes user discomfort in a vehicle, and prevents repeated occurrence of fogging.

2. Description of the Related Art

Generally, a vehicle is equipped with a heating, ventilation, and air-conditioning (HVAC) system for air conditioning of a vehicle interior, and in order to improve an air conditioning performance of the HVAC system, an interior space of the vehicle is sealed from the outside. The HVAC system includes a compressor to compress a refrigerant; a heat exchanger to condense the refrigerant compressed by the compressor; an expansion valve to expand the refrigerant condensed by the first heat exchanger; and a second heat exchanger to evaporate the refrigerant expanded by the expansion valve.

The refrigerant circulates among the compressor, the first heat exchanger, the expansion valve, and the second heat exchanger along a plurality of refrigerant pipes. In the heating mode of the vehicle interior, the flow of a high-temperature and high-pressure refrigerant discharged from the compressor is switched to be supplied to the first heat exchanger, so that the first heat exchanger, disposed in an air conditioning room of the HVAC housing included in the HVAC system, can serve as a condenser.

In the cooling mode of the vehicle interior, the flow of a high-temperature and high-pressure refrigerant discharged from the compressor is switched to be supplied to the second heat exchanger, so that the first heat exchanger, disposed in the air conditioning room of the HVAC housing included in the HVAC system, can serve as an evaporator.

However, if the HVAC system operates in the heating mode of the vehicle interior during the winter season, the relative humidity is increased due to a temperature difference between an atmosphere outside the vehicle (hereinafter referred to as "outside air") and air inside the vehicle (hereinafter referred to as "inside air"). For this reason, fogging occurs on the inner surface of the vehicle windshield glass.

When such fogging occurs, a defogging control mode can be performed depending on vehicle types to control the HVAC system to remove the fog. The defogging control mode may be defined as, for example, a control mode, in which the flow of a refrigerant is switched so that the first heat exchanger, which functions as the condenser in the heat mode of the vehicle interior, can temporarily serve as an evaporator, and by using cool air discharged from a discharge part of the HVAC system, the fog covering the inner surface of the vehicle windshield glass can be removed.

However, the existing method of defogging the inner surface of the vehicle windshield glass has a problem in that, in order to return to the original heating mode of the vehicle interior after completing defogging by the defogging control mode, the flow of high-temperature and high-pressure refrigerant discharged from the compressor is switched to be supplied to the first heat exchanger. However, condensed water, which is condensed on the surface of the first heat exchanger, is temporarily evaporated by the high-temperature and high-pressure refrigerant supplied into the first heat exchanger, and is discharged to the vehicle interior, thereby causing again the occurrence of fogging on the inner surface of the vehicle windshield glass (which is called "flash fogging" in which fogging occurs due to the evaporation of condensed water on the surface of the first heat exchanger, rather than the temperature difference between the outside air and the inside air).

In the existing defogging method, if such flash fogging occurs, the aforementioned defogging control mode is performed again. However, the method cannot prevent the occurrence of fogging, but merely repeats the defogging control mode every time fogging occurs, thereby still causing discomfort to the vehicle driver.

SUMMARY OF THE INVENTION

In order to solve the above problem, the present disclosure provides a method of defogging an inner surface of a vehicle windshield glass, which minimizes user discomfort in a vehicle while preventing repeated occurrence of fogging (or flash fogging).

To achieve these and other advantages and in accordance with the purpose of the present invention, as embodied and broadly described herein, the present invention provides in one aspect a method of defogging an inner surface of a vehicle windshield glass. The method includes a first process of defogging by changing a heating, ventilation, and air-conditioning (HVAC) system from a heating mode to a cooling mode when fogging occurs on the inner surface of the vehicle windshield glass; once the inner surface of the vehicle windshield glass is changed to a defogging state by the first process, a second process of pre-defogging by turning off a compressor of the HVAC system for a predetermined period of time under a prescribed condition to prevent flash fogging; and after the second process, when the predetermined period of time elapses, a third process of turning on the compressor to return from the cooling mode to the heating mode.

In another aspect, the present invention provides a method of defogging an inner surface of a vehicle windshield glass. The method includes a previous control process of controlling a heating, ventilation, and air-conditioning (HVAC) system for air conditioning of a vehicle interior by using either a user's setting or a Full Automatic Temperature Control (FATC) logic; a first process of defogging the inner surface of the vehicle windshield glass by using the HVAC system when fogging occurs on the windshield glass of the vehicle interior during the previous control process; once the inner surface of the vehicle windshield glass is changed to a defogging state by the first process, a second process of preventing flash fogging by turning off a compressor of the HVAC system; and after the second process, a process of returning to the previous control process.

In still another aspect, the present invention provides a method of defogging an inner surface of a vehicle windshield glass. The method includes a heating mode process of heating a vehicle interior by using an indoor heat exchanger serving as a condenser to condense a refrigerant; when fogging occurs on the inner surface of the windshield glass of the vehicle interior during the heating mode process, an anti-fogging process of switching a flow of the refrigerant so that the indoor heat exchanger serves as an evaporator to evaporate the refrigerant; and upon completing defogging by the anti-fogging process, an operation returning process of returning the flow of the refrigerant to the heating mode process. Further, the operation returning process includes turning off a compressor for a predetermined period of time before water condensed on a surface of the indoor heat exchanger serving as an evaporator during the anti-fogging process, is evaporated by the refrigerant in the indoor heat exchanger serving as a condenser during the heating mode process.

In another aspect, the present invention provides a heating, ventilation, and air-conditioning (HVAC) system in a vehicle. The HVAC system includes a compressor included in an air conditioning housing; an outdoor heat exchanger provided on an outside of the air conditioning housing and connected to the compressor via a refrigerant flow path; an indoor heat exchanger provided on an inside of the air conditioning housing, in which after the refrigerant is compressed to high pressure and high temperature by the compressor, the compressed refrigerant is discharged to the outdoor heat exchanger or the indoor heat exchanger depending on air conditioning modes of the vehicle interior; a 4-way valve connected along the refrigerant path to an output of the compressor and configured to switch a flow of a high pressure and high temperature refrigerant discharged from the compressor so that the refrigerant is discharged to the indoor heat exchanger for heating the vehicle interior; an expansion valve provided internally or externally of the air conditioning housing and connected in the refrigerant flow path between the indoor heat exchanger and the outdoor heat exchanger such that condensed refrigerant flows to the expansion valve and the outdoor heat exchanger sequentially, to be evaporated while being heat-exchanged with outside air; and a controller configured to when fogging occurs on an inner surface of a windshield glass of the vehicle interior, control the 4-way valve to switch a flow of the refrigerant to flow to the outdoor heat exchanger so that the indoor heat exchanger serves as an evaporator to evaporate the refrigerant, and upon completing defogging of the fogging on the inner surface of the windshield, turn off the compressor for a predetermined period of time so a temperature of the refrigerant is slowly increased, such that water condensed on a surface of the indoor heat exchanger is allowed to air dry, and turn on the compressor and control the 4-way valve to switch the flow of the refrigerant to the indoor heat exchanger.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE PREFERRED EMBODIMENTS

Figure 1:
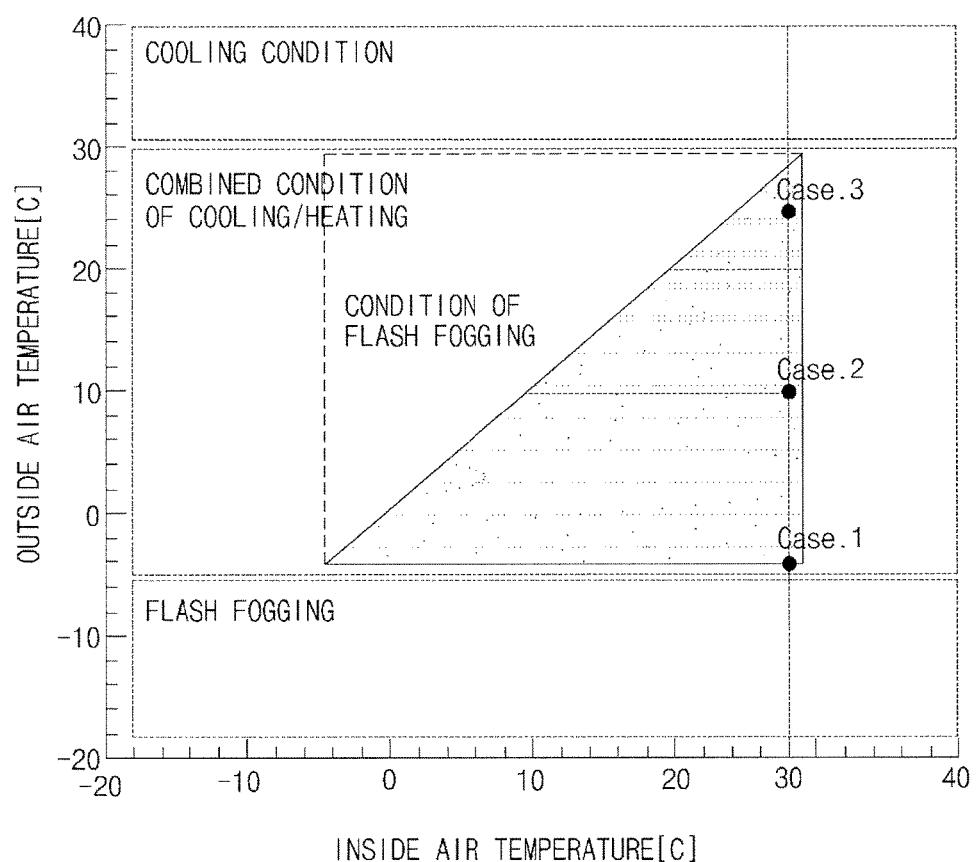
FIG. 1 is a graph showing conditions in which flash fogging occurs.
Figure 2:
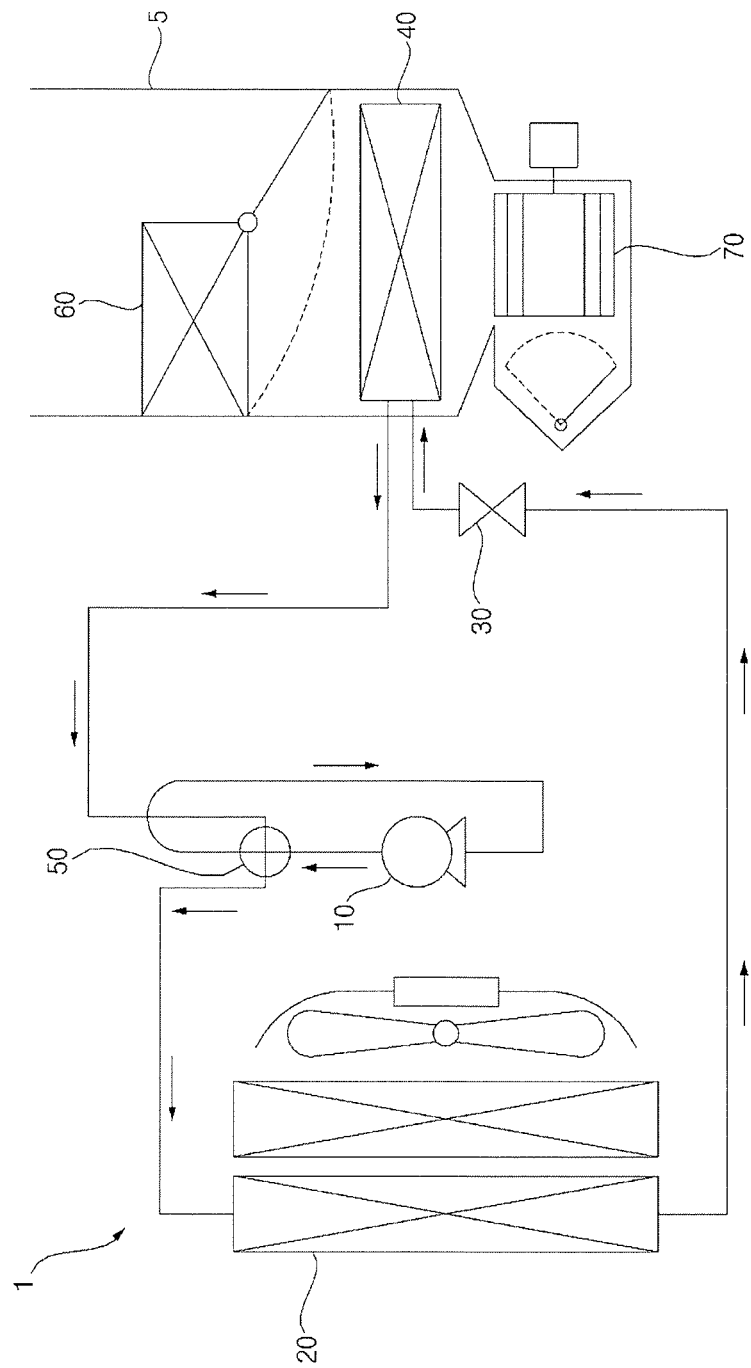
FIGS. 2 and 3 are diagrams illustrating a flow of refrigerant of a heating, ventilation, and air-conditioning (HVAC) system when flash fogging occurs.
Figure 3:
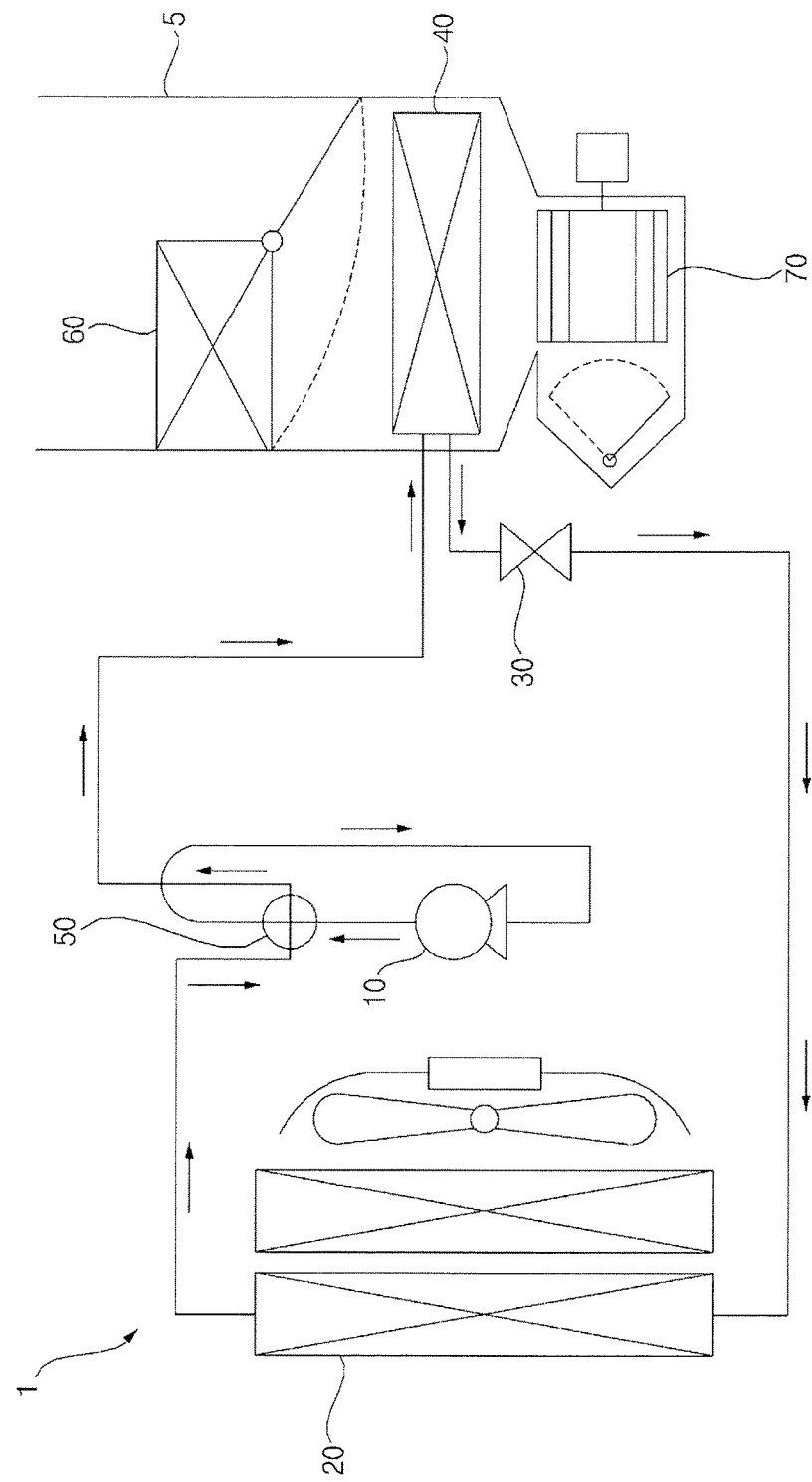
Figure 4:
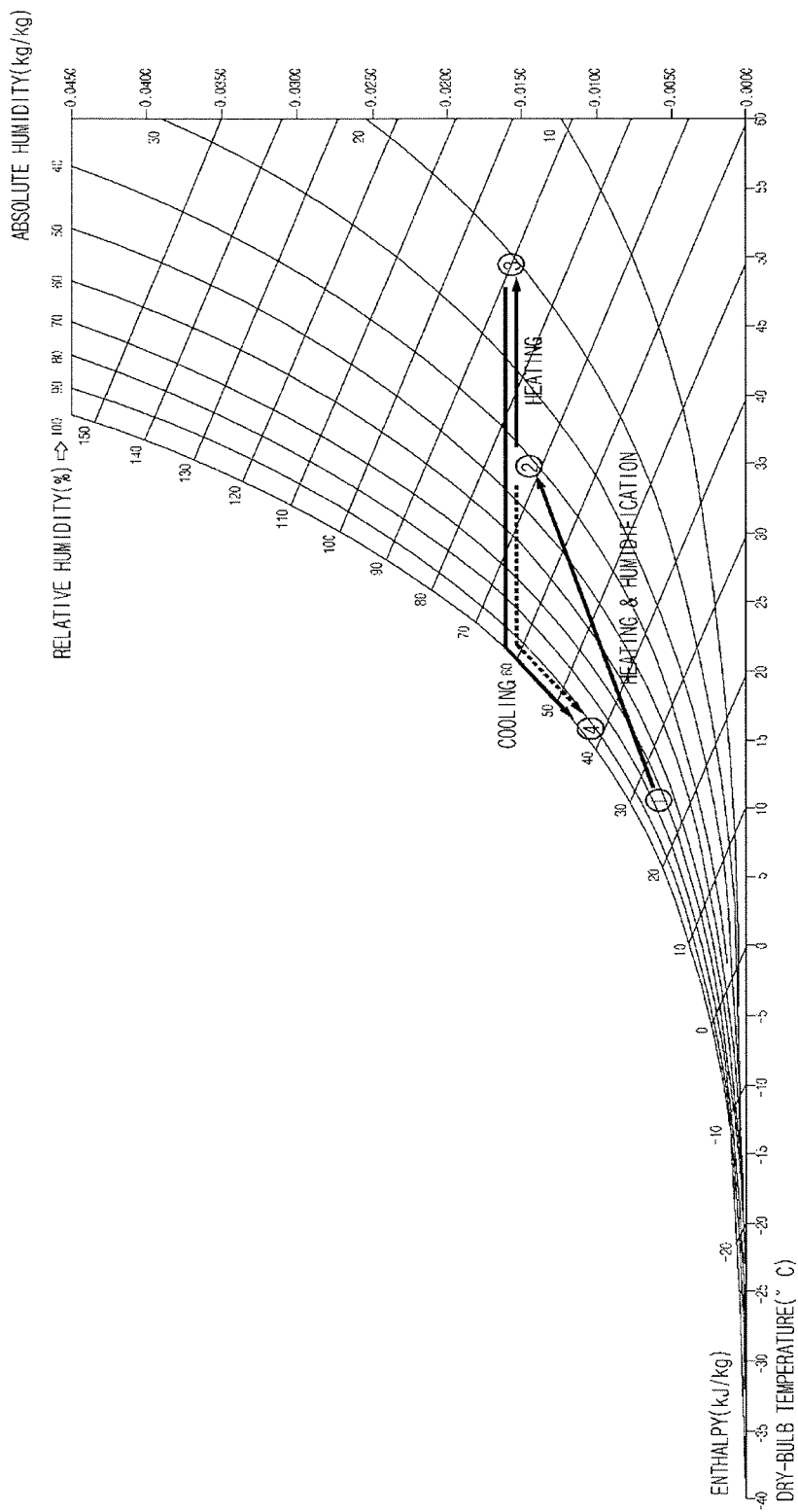
FIG. 4 is a diagram illustrating a psychrometric chart when flash fogging occurs.

Hereinafter, embodiments of a method of defogging an inner surface of a vehicle windshield glass will be described in detail with reference to the accompanying drawings. In particular, FIG. 1 is a graph showing conditions in which flash fogging occurs; FIGS. 2 and 3 are diagrams illustrating a flow of refrigerant of a heating, ventilation, and air-conditioning (HVAC) system when flash fogging occurs; and FIG. 4 is a diagram illustrating a psychrometric chart when flash fogging occurs.

According to a preferred embodiment of the present disclosure, the method of defogging the inner surface of the vehicle windshield glass includes controlling a heating, ventilation, and air-conditioning (HVAC) system 1 to operate in a defogging mode to remove fog when fogging occurs on the inner surface of the windshield glass in the vehicle; or includes controlling the HVAC system 1 to prevent in advance the occurrence of flash fogging, in which fogging occurs again after the defogging mode is performed.

In addition, fogging and flash fogging occur on the inner surface of the vehicle windshield glass, but the occurrence of fogging is not limited thereto, and fogging may also occur on the window of a door in the vehicle interior and a rear windshield glass of the vehicle interior.

In addition, fogging generally occurs due to a temperature difference between the temperature of a vehicle interior (hereinafter referred to as "inside air temperature") and the temperature outside the vehicle (hereinafter referred to as "outside air temperature"). For example, when the inside air temperature is higher than the outside air temperature, warm air contacts the inner surface of the windshield glass which has a relatively low temperature, thereby reaching a dew-point temperature, which results in the occurrence of fogging.

As described above, when fogging occurs on the inner surface of the vehicle windshield glass, the method of defogging the inner surface of the vehicle windshield glass according to an embodiment of the present disclosure includes a first process of defogging by changing the HVAC system 1 from a heating mode to a cooling mode. Here, the term "defogging" refers to a process to completely remove fog (i.e., fogging state); and the "defogging mode" refers to a series of operation modes performed to complete a defogging process. Further, a defogging state indicates when fog is completely or sufficiently removed as described above.

Accordingly, the first process can be defined as a process of defogging the inner surface of the vehicle windshield glass by using air discharged from the HVAC system 1. The HVAC system 1, which is short for a heating, ventilation, and air-conditioning system, performs functions for air conditioning of the vehicle interior, and thus includes all possible devices, regardless of names, as long as the devices perform air-conditioning functions for air-conditioning of the vehicle interior.

As illustrated in FIGS. 2 and 3, the HVAC system 1 generally includes a refrigerant flow path which forms a thermodynamic cycle. More specifically, the HVAC system 1 includes a compressor 10 included in an air conditioning housing 5; an outdoor heat exchanger 20 provided on the outside of the air conditioning housing 5; an expansion valve 30 provided internally or externally of the air conditioning housing 5; and an indoor heat exchanger 40 provided on the inside of the air conditioning housing 5, in which after the refrigerant is compressed to high pressure and high temperature by the compressor 10, the compressed refrigerant is discharged to the outdoor heat exchanger 20 or the indoor heat exchanger 40 depending on air conditioning modes of the vehicle interior.

When the HVAC system 1 is controlled (e.g., by a controller) in a cooling mode, air-conditioning is performed as illustrated in FIG. 2 so the flow of the high pressure and high temperature refrigerant discharged from the compressor 10 is switched by a 4-way valve 50 so that the refrigerant may be discharged to the outdoor heat exchanger 20; the refrigerant is heat-exchanged with outside air in the outdoor heat exchanger 20 to be condensed, and then flows to the expansion valve 30 and the indoor heat exchanger 40 sequentially; the resulting refrigerant is evaporated while being heat-exchanged with inside air in the indoor heat exchanger 40; and the inside air, of which temperature is lowered by reflective heat-exchange, is discharged into the interior of the vehicle (hereinafter referred to as the "vehicle interior") for cooling the vehicle interior.

By contrast, when the HVAC system 1 is controlled in a heating mode, air-conditioning is performed as illustrated in FIG. 3 so the flow of the high pressure and high temperature refrigerant discharged from the compressor 10 is switched by the 4-way valve 50 so that the refrigerant is discharged to the indoor heat exchanger 40; the refrigerant is heat-exchanged with inside air in the outdoor heat exchanger 20 to be condensed; and the inside air, of which temperature is increased by reflective heat-exchange, is discharged into the vehicle interior for heating the vehicle interior, and at the same time, the condensed refrigerant flows to the expansion valve 30 and the outdoor heat exchanger 20 sequentially, to be evaporated while being heat-exchanged with outside air. Here, fogging occurs mostly when the HVAC system 1 operates in the heating mode.

Once fogging occurs, a first process is performed as illustrated in FIG. 2, in which the flow of the refrigerant discharged from the compressor 10 is switched by the 4-way valve 50 so that the refrigerant flows to the outdoor heat exchanger 20; the refrigerant expanded by the expansion valve 30 is heat-exchanged with indoor air so that the refrigerant is evaporated in the indoor heat exchanger 40; and then, air-conditioned air is discharged to the vehicle interior, thereby lowering the overall temperature of the vehicle interior.

Upon completing defogging of the inner surface of the windshield glass in the above first process, the method of defogging the inner surface of the vehicle windshield glass further includes a third process of returning to an original heating mode. The third process includes switching the flow of the refrigerant by using the 4-way valve 50, so that the flow of the refrigerant, which has been switched for the cooling mode, is switched again for the heating mode.

However, as illustrated in FIGS. 1 to 4 and as discussed above, if the third process is performed immediately after completing the first process, flash fogging may occur in which fogging occurs again on the inner surface of the windshield glass. Such flash fogging occurs under specific conditions as described above with reference to FIG. 1. More specifically, flash fogging generally does not occur under severe cold weather conditions where heating of the vehicle interior is required, or under severe hot weather conditions where cooling of the vehicle interior is required.

That is, as illustrated in FIG. 1, flash fogging tends to occur only under temperature conditions where it is required to switch from the cooling mode of the vehicle interior to the heating mode, or vice versa. The flash fogging occurs under the condition of outside air temperature of −5° C. to 30° C. As typical examples of conditions causing flash fogging, three cases will be described as follows.

Case 1 is a condition where outside air temperature is −5° C., inside air temperature is 28° C., and relative humidity is 60%, as illustrated in FIG. 1. Here, the condition of flash fogging, which includes the inside air temperature at 28° C. and the relative humidity at 60%, shows that the method of defogging the inner surface of the vehicle windshield glass according to the present disclosure may also be applied to such unfavorable condition, in which as the inside air temperature and the relative humidity is increased, the amount of condensed water when the HVAC system 1 operates in the cooling mode is also increased. In this instance, flash fogging occurs very frequently when the third process is performed immediately after the first process.

Case 2 is a condition where outside air temperature is 10° C., and the inside air temperature and the relative humidity are the same as Case 1, as illustrated in FIG. 1. This case indicates the in-between seasons, during which the HVAC system 1 is frequently changed from a cooling mode to a heating mode.

Case 3 is a condition where outside air temperature is 25° C., and the inside air temperature and the relative humidity are the same as Case 1, as illustrated in FIG. 1. This case indicates the rainy season, during which the HVAC system 1 operates in a dehumidification mode and is changed to a heating mode.

The occurrence of flash fogging will now be described by using a psychrometric chart illustrated in FIG. 4. In the above Cases 1 to 3, when the HVAC system 1 operates in a cooling mode to perform the first process, as illustrated in FIG. 4, water is condensed on an external surface of the indoor heat exchanger 40 while being heat-exchanged with inside air; and when the HVAC system 1 operates in a heating mode to perform the third process, the temperature of the indoor heat exchanger 40 is increased, such that the water condensed on the external surface is evaporated and is discharged to the vehicle interior, and inside air is heated and humidified, thereby increasing a dry-bulb temperature and absolute humidity (see processes ①-② of FIG. 4).

Further, when a third process is performed by operating at the same time both the indoor heat exchanger 40 and a Positive Temperature Coefficient (PCT) heater 60 included in the HVAC system 1, inside air heated and humidified by the indoor heat exchanger 40 is further heated by the PCT heater 60, thereby increasing the dry-bulb temperature, as illustrated in FIG. 4. In this instance, there is no change in the absolute humidity (see processes ②-③ of FIG. 4).

As described above, flash fogging occurs so inside air, heated and humidified by using the indoor heat exchanger 40 alone or in combination with the PTC heater 60, is cooled while contacting the inner surface of the windshield glass which has been cooled during the first process, and relative humidity is increased in the vicinity of the inner surface of the windshield glass, thereby causing fogging again (see processes ③-④ and ②-④ of FIG. 4).

The method of defogging the inner surface of the vehicle windshield glass according to the present disclosure further includes a second process, in which before preforming the third process after the first process, once a fogging state is changed to a defogging state by the first process, the compressor 10 is turned off for a predetermined period of time under prescribed conditions for pre-defogging, thereby preventing flash fogging.

When the compressor 10 is turned off immediately after completing the first process, the refrigerant stops flowing, and the temperature of the refrigerant is slowly increased, such that water condensed on the surface of the indoor heat exchanger 40 is allowed to air dry. Accordingly, it is preferable to set the predetermined period of time as a period during which water condensed on the surface of the indoor heat exchanger 40, which operates to perform a role of an evaporator for defogging in the first process among the devices of the HVAC system 1, is allowed to completely air dry.

In addition, the indoor heat exchanger 40 has different surface areas depending on specifications and exterior. The predetermined period of time, during which water condensed on the surface of the indoor heat exchanger 40 is allowed to air dry, is closely related with the temperature and humidity of outside air, and can be set depending on whether a blower fan 70, which is one of the devices in the HVAC system 1, operates or not.

Even when a target temperature set for a heating mode is not reached, it is preferable to perform the first process and the second process preferentially. That is, the defogging mode (first process), in which fog covering the inner surface of the vehicle windshield glass is removed, and the pre-defogging mode (second process), in which fogging is prevented in advance, are performed to secure driving safety, which should be put before the air-conditioning effect expected by a user when operating the HVAC system 1.

Accordingly, even when a user operates the HVAC system 1 in a heating mode to reach a target temperature, if there is a possibility that fogging or flash fogging may occur, the defogging mode (first process) and the pre-defogging mode (second process) should be performed preferentially, even though the target temperature is not reached.

Figure 5:
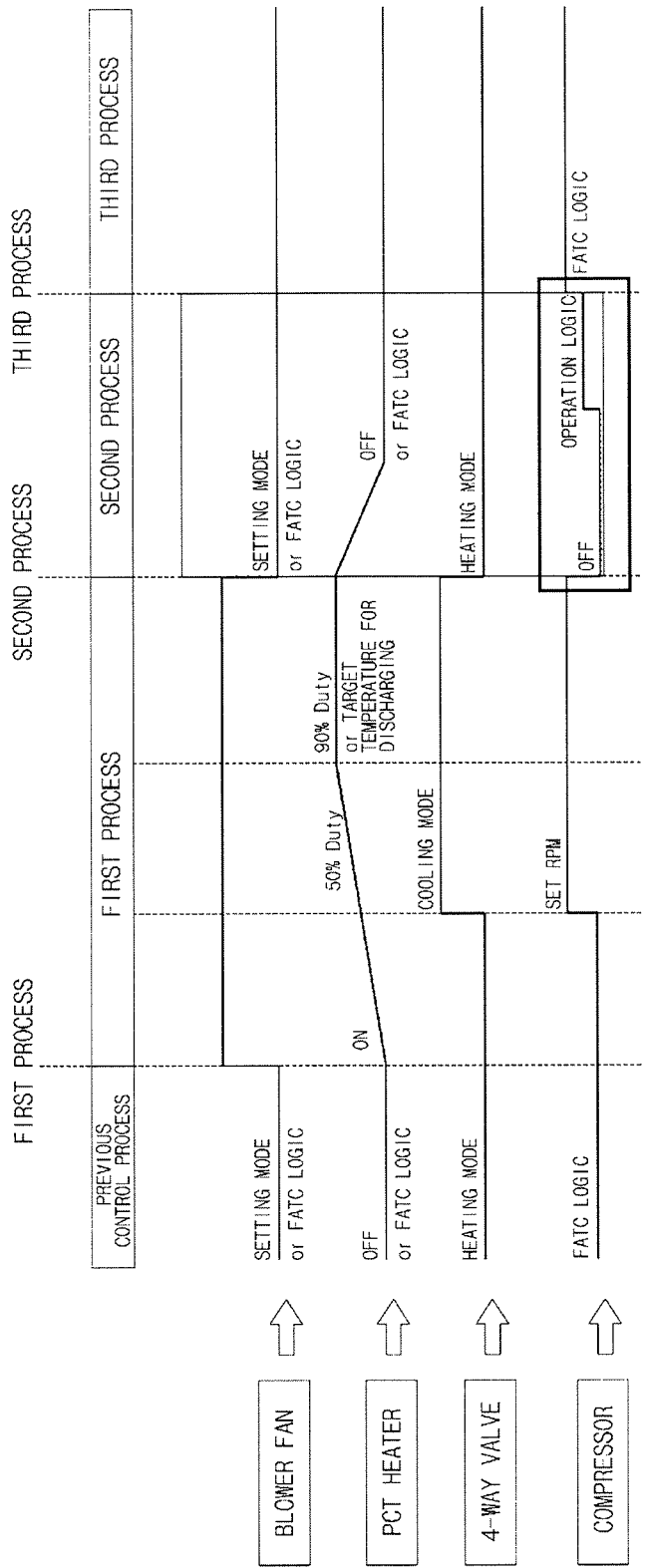
FIG. 5 is a control diagram of an HVAC system, which illustrates a control logic of a method of defogging an inner surface of a vehicle windshield glass according to an exemplary embodiment of the present invention.

Next, FIG. 5 is a control diagram of an HVAC system, which illustrates a control logic of a method of defogging the inner surface of the vehicle windshield glass according to an embodiment of the present invention. Hereinafter, in order to more clearly understand embodiments of the method of defogging the inner surface of the vehicle windshield glass according to the present disclosure, each process will be defined as follows.

A control process before the first process is a process of controlling the HVAC system 1 for air conditioning of the vehicle interior by using either a setting mode set by a user, or a Full Automatic Temperature Control (FATC) logic, which is computer programmed to be automatically performed according to inside air temperature or outside air temperature. The control process before the first process is defined as a "previous control process."

Accordingly, the first process can be defined as a process of changing the previous control process from a heating mode, in which the indoor heat exchanger 40 included in the HVAC system 1 performs a function of a condenser, to a cooling mode in which the indoor heat exchanger 40 performs a function of an evaporator. The prescribed condition to perform the second process may be set as a condition where when inside air contacts the inner surface of the windshield glass, a dry-bulb temperature is reduced and relative humidity is increased on the thermodynamic psychrometric chart, as described above with reference to FIG. 4.

For example, in order to implement the method of defogging the inner surface of the vehicle windshield glass, a first temperature and humidity sensor to measure outside air temperature and humidity; and a second temperature and humidity sensor to measure temperature and humidity of vehicle interior may be further included. Here, the inner surface of the windshield glass is a structure that directly contacts outside air and is differentiated from the vehicle interior, such that the first temperature and humidity sensor is not necessarily provided on the outside of the vehicle interior, and can be provided on a position where outside temperature and humidity of the windshield glass may be measured, and particularly may also be provided on the inner surface of the windshield glass when the temperature of the windshield glass is measured.

Further, the second temperature and humidity sensor can be provided in the vehicle interior, and also be provided inside the air conditioning housing 5 of the HVAC system 1. By using the second temperature and humidity sensor, the temperature and humidity of inside air, which is heat-exchanged by the indoor heat exchanger 40, can be measured.

Here, the prescribed condition to perform the second process is a condition where the dry-bulb temperature is reduced and the relative humidity is increased when inside air contacts the inner surface of the windshield glass as described above; and the second process can be performed by predicting the occurrence of flash fogging based on the thermodynamic psychrometric chart illustrated in FIG. 4, to which temperature and humidity values measured by the first temperature and humidity sensor and the second temperature and humidity sensor are applied.

Further, the predetermined period of time in the second process can be set to increase as the outside air increases. The reason for this is that as the outside air temperature becomes lower, the amount of humidity contained in the outside air is relatively small, and the amount of water condensed on the surface of the indoor heat exchanger 40 is also small when the indoor heat exchanger 40 operates in the defogging mode during the first process, such that when the outside air temperature is low, a period of time when the condensed water is allowed to air dry is also reduced.

By contrast, as the outside air temperature becomes higher, the amount of humidity contained in the outside air is relatively large, and the amount of water condensed on the surface of the indoor heat exchanger 40 is also large when the indoor heat exchanger 40 operates in the defogging mode during the first process, such that when the outside air temperature is high, a period of time when the condensed water is allowed to air dry is also increased. Accordingly, as the outside air temperature increases, it is preferable to increase a period of time when the compressor 10 is turned off.

When the outside air temperature is at a level equal to or lower than 5° C., the period of time when the compressor 10 is turned off can be set to be approximately 1 minute or less, and when the outside air temperature is higher than 5° C., the period of time when the compressor 10 is turned off can be set to be maximum 10 minutes or less.

In addition, during the second process, the PTC heater 60 can be set to be turned on, so that a minimum target temperature can be reached when a passenger aboard the vehicle operates only the PTC heater 60. When outside air is introduced into the air conditioning housing 5 and is heat-exchanged with the indoor heat exchanger 40, the PCT heater 60 is configured to increase temperature of the air, and is provided at a position that does not physically affect evaporation of water condensed on the indoor heat exchanger 40, thereby achieving a heating effect, which otherwise is not obtained when the compressor 10 is turned off.

In the method of defogging the inner surface of the vehicle windshield glass, all the processes performed before the first process are defined as the "previous control process." The previous control process can be generally performed by controlling the HVAC system 1, which operates for air-conditioning of the vehicle interior, by using either a user's setting or the FATC logic. Similarly, a process of returning to a previous control process after the second process is performed can be referred to as a process of returning to a previous control process regardless of names of each operation mode.

Hereinafter, in order to more clearly illustrate the method of defogging the inner surface of the vehicle windshield glass according to an embodiment of the present disclosure, a process of defogging when fogging occurs while the HVAC system 1 operates in a heating mode during the winter season will be described in detail with reference to FIG. 5. The process performed after the dehumidification mode during the in-between season or the rainy season in summer is not described in detail, because the process is in the same manner as above, and the scope of the present disclosure is not limited.

First, when a user gets into the vehicle during the winter season, the user operates the HVAC system 1 in a mode set by using a setting unit provided for the vehicle, thereby operating the HVAC system 1 in a heating mode. Then, the compressor 10 operates at a set RPM to compress a refrigerant; the 4-way valve 50 switches the flow of the refrigerant, compressed by the compressor 10, to flow to the indoor heat exchanger 40, so that the indoor heat exchanger 4 can serve as a condenser; the blower fan 70 operates by the user's setting; and the PTC heater 60 can be set to be turned on at the initial time of the heating mode, and be set to be turned off after a lapse of a predetermined time.

While the HVAC system 1 operates in the heating mode, and when fogging occurs on the inner surface of the windshield glass, or when it is determined that the inner surface of the windshield glass fogs up based on the outside air temperature and humidity and the inside air temperature and humidity measured by the first and second temperature and humidity sensor, the 4-way valve 50 is switched so that the high-temperature and high-pressure refrigerant discharged from the compressor 10 flows to the indoor heat exchanger 20, and the indoor heat exchanger 40 serves as an evaporator. In this instance, fog can be removed by cool air discharged to the inner surface of the windshield glass (first process of defogging).

Once the inner surface of the windshield glass is changed to a defogging state by the first process, the second process is performed. Here, the second process can be performed by predicting the occurrence of flash fogging on the inner surface of the windshield glass based on the temperature and humidity of the outside air (or windshield) and the inside air measured by the first and second temperature and humidity sensor.

More specifically, the second process includes turning off the compressor 10 for a predetermined period of time. That is, the second process includes turning off an anti-flash fogging compressor (hereinafter simply referred to as a "process of turning off the compressor") to turn off the compressor 10 in the HVAC system 1 for a predetermined period of time under prescribed conditions.

In addition, the second process further includes under the same condition as the condition to perform the process of turning off the compressor, a process of controlling anti-flash fogging blower fan (hereinafter simply referred to as a "process of controlling the blower fan") to control the blower fan 70 in the HVAC system 1; a process of controlling an anti-flash fogging heater (hereinafter simply referred to as a "process of controlling the heater") to control the PTC heater 60 in the HVAC system 1; and a process of controlling an anti-flash fogging heat exchanger (hereinafter simply referred to as a "process of controlling the heat exchanger") to control the indoor heat exchanger 40.

In the process of turning off the compressor 10, the time when the compressor 10 is turned off is preferable to be the same as the time when the first process ends. That is, once it is determined that fogging on the inner surface of the windshield glass is completely removed, the compressor 10 is turned off, and at the same time, switching and flowing of a refrigerant is prevented until a predetermined period of time elapses.

In this instance, the 4-way valve 50 is not necessarily switched immediately, but in order to prepare for the third process after the second process is performed, the 4-way valve 50 can be switched in advance so that the refrigerant to be discharged from the compressor 10 flows to the indoor heat exchanger 40. However, when there is a possibility that a remaining high-temperature refrigerant discharged from the compressor 10 will be introduced to the indoor heat exchanger 40, a pre-defogging process has been completed to prevent flash fogging, such that by using the 4-way valve 50, the flow of the refrigerant can be switched when the third process is performed.

In the process of controlling a heater, the PTC heater 60 can be controlled to be maintained in an OFF state, but the PTC heater 60 can also be controlled to be turned on so that air, which has been pre-heated and the temperature has increased, can be discharged before the air-conditioned air in a heating mode is discharged to a passenger of the vehicle interior during the third process. That is, the process of controlling a heater basically includes turning on the PTC heater 60 during part of the period when the compressor 10 is turned off.

Further, in the process of controlling the blower fan, the blower fan 70 can be turned off so that water condensed on the surface of the indoor heat exchanger 40 is allowed to air dry, but the blower fan 70 can be turned on in the same manner as the previous control process. Here, the period of time when the blower fan 70 is turned on can be set by considering the time when water condensed on the surface of the indoor heat exchanger 40 is allowed to air dry. That is, in the process of controlling the blower fan, the period of time when the blower fan 70 is turned on can also be set by considering the time when water condensed on the surface of the indoor heat exchanger 40 is allowed to air dry.

According to the present disclosure, the method of defogging the inner surface of the vehicle windshield glass includes a heating mode process of heating a vehicle interior by using the indoor heat exchanger 40 which serves as a condenser to condense a refrigerant; when fogging occurs on the inner surface of the windshield glass of the vehicle interior during the heating mode, an anti-fogging process of switching the flow of the refrigerant so that the indoor heat exchanger 40 can serve as an evaporator to evaporate the refrigerant; and upon completing defogging by the anti-fogging process, an operation returning process of returning the flow of the refrigerant to the heating mode process.

Here, the operation returning process can be defined as a process of turning off the compressor 10 for a predetermined period of time before water condensed on the surface of the indoor heat exchanger 40, which serves as an evaporator during the anti-fogging process, is evaporated by the refrigerant in the indoor heat exchanger 40 which serves as a condenser during the heating mode process.

As described above, evaporation of the condensed water during the operation returning process can be determined based on the temperature of the refrigerant flowing inside the indoor heat exchanger 40 and the outside air temperature of the indoor heat exchanger 40. Further, evaporation of the condensed water can be determined based on whether the blower fan 70 operates, and by considering when there is a temperature change in the air conditioning housing 5 of the HVAC system 1 including which the indoor heat exchanger 40.

The method of defogging the inner surface of the vehicle windshield glass according to the present disclosure can be briefly described as follows. First, in the heating mode, when fogging occurs on the inner surface of the windshield glass while the HVAC system 1 operates, the 4-way valve is switched so that a high-temperature and high-pressure refrigerant discharged from the compressor 10 flows to the outdoor heat exchanger 20, thereby enabling the indoor heat exchanger 40 to serve as an evaporator.

In this instance, the air, which has been heat-exchanged by the evaporator, is discharged to the inner surface of the windshield glass, thereby completing the defogging process. Upon completing the defogging of the inner surface of the windshield glass, the compressor 10 is turned off for a predetermined period of time before the HVAC system 1 returns to the original heating mode.

Then, water condensed on the surface of the indoor heat exchanger 40, which has served as the evaporator for a predetermined period of time, is allowed to air dry, and the HVAC system 1 returns to the heating mode process, such that even when the indoor heat exchanger 40 serves as a condenser, humidity is not suddenly provided to the vehicle interior, and the dry-bulb temperature of air at the inner surface of the windshield glass is not reduced or the relative humidity is not increased, thereby preventing flash fogging in advance.

After a predetermined time has elapsed, the compressor 10 operates normally in the heating mode, such that a user can safely drive without repeated fogging on the inner surface of the windshield glass. A controller (e.g., hardware-embedded processor) can also be included to control the elements in the HVAC system (e.g., to control the compressor to turn off, control the 4-way valve, etc.)

The embodiments of the present disclosure provide several advantages. For example, in the method of defogging the inner surface of the vehicle windshield glass, the occurrence of flash fogging, in which fogging occurs again after a defogging operation is performed to remove the fog covering the inner surface of the vehicle windshield glass, can be prevented in advance, thereby enabling safe driving for a vehicle driver. Further, a separate structure is not needed to prevent the flash fogging, thereby enabling a simple product design.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of defogging an inner surface of a vehicle windshield glass, the method comprising:
   a first process of defogging by changing a heating, ventilation, and air-conditioning (HVAC) system from a heating mode to a cooling mode when fogging occurs on the inner surface of the vehicle windshield glass;
   once the inner surface of the vehicle windshield glass is changed to a defogging state by the first process, a second process of pre-defogging by turning off a compressor of the HVAC system for a predetermined period of time under a prescribed condition to prevent flash fogging;
   wherein the prescribed condition to perform the second process comprises a condition where a dry-bulb temperature on a thermodynamic psychrometric chart, which is calculated based on a temperature difference between an interior of the vehicle and outside air, is reduced and a relative humidity is increased; and
   after the second process, when the predetermined period of time elapses, a third process of turning on the compressor to return from the cooling mode to the heating mode.

2. The method of claim 1, wherein the first process and the second process are preformed even when a target temperature for the heating mode is not reached.

3. The method of claim 1, wherein the predetermined period of time is set as a time when water condensed on a surface of an indoor heat exchanger included in the HVAC system, which serves as an evaporator of the HVAC system for the defogging in the first process, is allowed to air dry.

4. The method of claim 1, wherein the compressor is turned off in the second process when the first process ends.

5. The method of claim 1, wherein the predetermined period of time in the second process is set to increase as the temperature of the outside air increases.

6. The method of claim 1, further comprising: turning on a PTC heater included in the HVAC system in the second process.

7. The method of claim 1, wherein the prescribed condition to perform the second process comprises predicting the flash fogging occurring on the inner surface of the windshield glass based on values measured by a first temperature and humidity sensor, which measures a temperature and humidity of outside air, and a second temperature and humidity sensor, which measures a temperature and humidity of an interior of the vehicle.

8. A method of defogging an inner surface of a vehicle windshield glass, the method comprising:
   a previous control process of controlling a heating, ventilation, and air-conditioning (HVAC) system for air conditioning of a vehicle interior by using either a user's setting or a Full Automatic Temperature Control (FATC) logic;
a first process of defogging the inner surface of the vehicle windshield glass by using the HVAC system when fogging occurs on the windshield glass of the vehicle interior during the previous control process;
once the inner surface of the vehicle windshield glass is changed to a defogging state by the first process, a second process of preventing flash fogging by turning off a compressor of the HVAC system and controlling a blower fan by determining a period of time the blower fan is turned on by considering a period of time when water condensed on a surface of the indoor heat exchanger is allowed to air dry by the blower fan; and
after the second process, a process of returning to the previous control process.

9. The method of claim 8, wherein the first process corresponds to the previous control process changing from a heating mode, in which an indoor heat exchanger of the HVAC system serves as a condenser, to a cooling mode in which the indoor heat exchanger serves as an evaporator.

10. The method of claim 8, wherein the compressor is turned off for a predetermined period of time under a prescribed condition.

11. The method of claim 10, wherein under a same condition as a condition to perform the process of turning off the compressor, the second process further comprises:
a process of controlling a blower fan included in the HVAC system;
a process of controlling a PTC heater included in the HVAC system; and
a process of controlling an indoor heat exchanger of the HVAC system.

12. The method of claim 11, wherein the process of controlling the blower fan comprises turning off the blower fan or controlling the blower fan in a same manner as the previous control process.

13. The method of claim 11, wherein the process of controlling the PTC heater comprises turning on the PTC heater during part of a period when the compressor is turned off.

14. A method of defogging an inner surface of a vehicle windshield glass, the method comprising:
a heating mode process of heating a vehicle interior by using an indoor heat exchanger serving as a condenser to condense a refrigerant;
when fogging occurs on the inner surface of the windshield glass of the vehicle interior during the heating mode process, an anti-fogging process of switching a flow of the refrigerant so that the indoor heat exchanger serves as an evaporator to evaporate the refrigerant; and
upon completing defogging by the anti-fogging process, an operation returning process of returning the flow of the refrigerant to the heating mode process, wherein the operation returning process includes turning off a compressor for a predetermined period of time before water condensed on a surface of the indoor heat exchanger serving as an evaporator during the anti-fogging process, is evaporated by the refrigerant in the indoor heat exchanger serving as a condenser during the heating mode process; and
determining evaporation of the condensed water during the operation returning process based on a temperature of the refrigerant flowing inside the indoor heat exchanger and an outside air temperature of the indoor heat exchanger, and based on whether a blower fan operates to blow air inside an air conditioning housing including the indoor heat exchanger, to the vehicle interior.

15. The method of claim 14, further comprising:
determining evaporation of the condensed water during the operation returning process based on a temperature of the refrigerant flowing inside the indoor heat exchanger and an outside air temperature of the indoor heat exchanger.

16. A heating, ventilation, and air-conditioning (HVAC) system in a vehicle, the HVAC system comprising:
a compressor included in an air conditioning housing;
an outdoor heat exchanger provided on an outside of the air conditioning housing and connected to the compressor via a refrigerant flow path;
an indoor heat exchanger provided on an inside of the air conditioning housing;
a 4-way valve connected along the refrigerant path to an output of the compressor and configured to switch a flow of a high pressure and high temperature refrigerant discharged from the compressor so that the refrigerant is discharged to the indoor heat exchanger for heating the vehicle interior;
an expansion valve provided internally or externally of the air conditioning housing and connected in the refrigerant flow path between the indoor heat exchanger and the outdoor heat exchanger such that condensed refrigerant flows to the expansion valve and the outdoor heat exchanger sequentially, to be evaporated while being heat-exchanged with outside air; and
a controller configured to:
when fogging occurs on an inner surface of a windshield glass of the vehicle interior, control the 4-way valve to switch the flow of the refrigerant to flow to the outdoor heat exchanger so that the indoor heat exchanger serves as an evaporator to evaporate the refrigerant, and
upon completing defogging of the fogging on the inner surface of the windshield, turn off the compressor for a predetermined period of time so a temperature of the refrigerant is slowly increased, such that water condensed on a surface of the indoor heat exchanger is allowed to air dry, and
turn on the compressor and control the 4-way valve to switch the flow of the refrigerant to the indoor heat exchanger.

17. The HVAC system of claim 16, wherein the predetermined period of time is set to increase as the temperature of the outside air increases.

* * * * *